United States Patent [19]

Yoshida et al.

[11] 4,167,597
[45] Sep. 11, 1979

[54] PROCESS FOR EXTENDING THE LIFE OF AN ANTIFOULING PAINT FILM

[75] Inventors: Morio Yoshida, Kawanishi; Ikuo Asato, Osaka; Toru Semba, Hirakata; Kiyoshi Murase, Amagasaki, all of Japan

[73] Assignee: Toa Paint Company, Ltd., Osaka, Japan

[21] Appl. No.: 900,778

[22] Filed: Apr. 28, 1978

Related U.S. Application Data

[63] Continuation-in-part of Ser. No. 780,426, Mar. 23, 1977, abandoned.

[51] Int. Cl.$^2$ .............................................. B05D 1/36
[52] U.S. Cl. ............................. 427/407 B; 114/67 R; 427/407 G; 427/408; 427/409; 428/35; 428/522; 428/907
[58] Field of Search .................. 427/408, 409, 407 G, 427/407 B; 106/15 R; 114/67 R; 428/35, 463, 522, 907

[56] References Cited

U.S. PATENT DOCUMENTS

| | | | |
|---|---|---|---|
| 3,990,381 | 11/1976 | Shepherd et al. | 106/15 R |
| 4,021,392 | 5/1977 | Milne et al. | 427/409 X |

*Primary Examiner*—Evan K. Lawrence
*Attorney, Agent, or Firm*—Armstrong, Nikaido, Marmelstein & Kubovcik

[57] ABSTRACT

A process for extending the life of an antifouling paint film which comprises applying onto an antifouling paint film a coating of a water-permeable graft polymer prepared by polymerizing one or more vinyl monomers in the presence of a hydrophilic polymer. The coating of the water-permeable graft polymer has an excellent water-resistance and a proper water-permeability by which an antifouling agent contained in the antifouling paint film can be leached into sea water and moreover the leaching rate can be controlled. As a result, the antifouling property of the paint film is exhibited for a long period of time.

4 Claims, 2 Drawing Figures

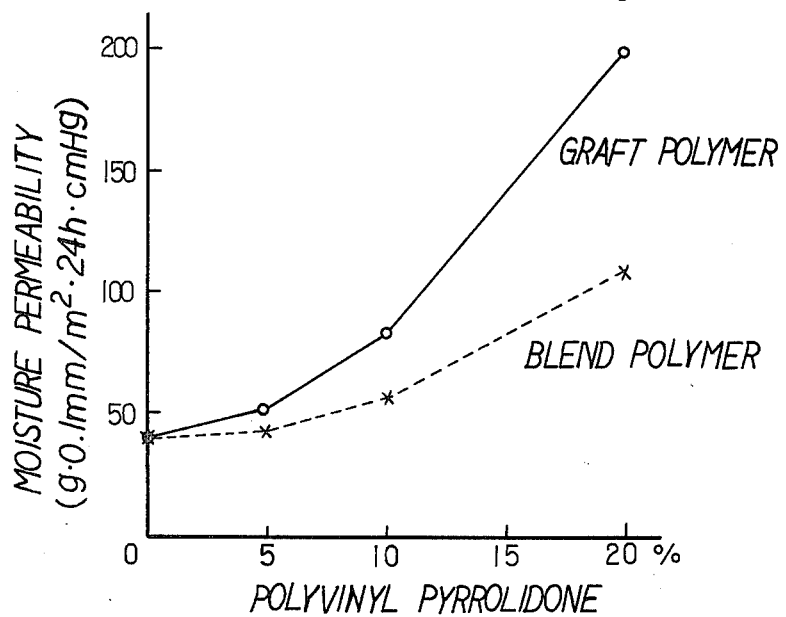
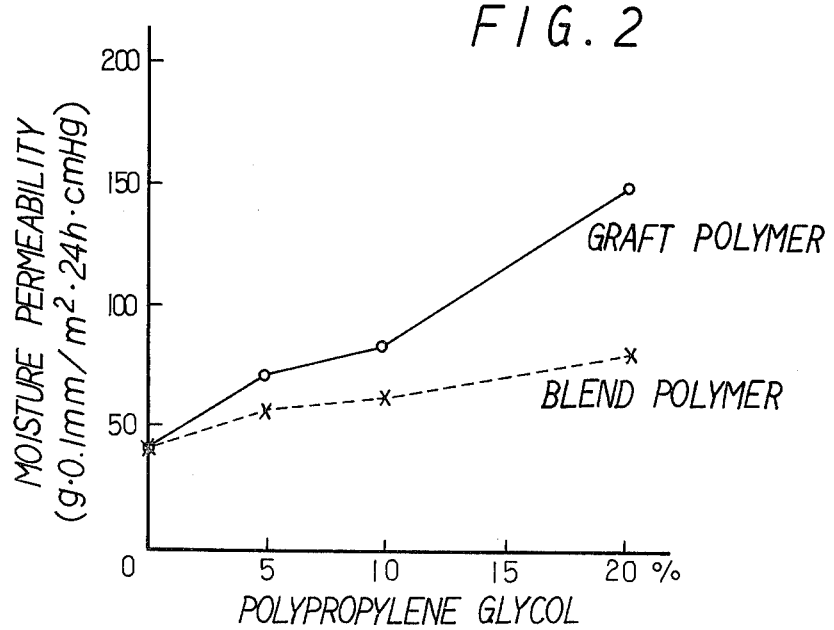

PROCESS FOR EXTENDING THE LIFE OF AN ANTIFOULING PAINT FILM

CROSS-REFERENCE TO RELATED APPLICATION

This application is a continuation-in-part of applicants' copending application Ser. No. 780,426 filed on Mar. 23, 1977 and now abandoned.

BACKGROUND OF THE INVENTION

The present invention relates to a novel process for extending the life of an antifouling paint film for structures immersed in sea water. More particularly, the invention relates to a process for extending the life of the paint film by applying onto an antifouling paint film a coating of a graft polymer which is capable extending the life of the paint film.

The maintenance of the antifouling property of an antifouling paint film for structures immersed in sea water, for instance, moving structures such as ships and stationary structures such as wharves, piers and bridges, for a long period of time contributes greatly to the economical operation of the structures and the effective utilization of natural resources. Accordingly, there has been a constant demand for the development of a paint having a superior antifouling property and of a process for maintaining the antifouling property of the paint film for a long period of time.

The antifouling paints for preventing the fouling of aquatic organisms are classified into two large groups. One group is those employing a hydrophilic synthetic polymer as a main binder. The other group is those employing rosin as a main binder. In the paint film formed from such a paint containing a rosin binder, an antifouling agent contained in the paint film is leached from the paint film with the leaching of rosin. Most antifouling paints belong to this group. However, the leaching of rosin results in the degradation of the paint film per se. In fact, the paint film formed from a paint of the latter group is considerably eroded and the toughness of the paint film is lowered, when it is immersed in sea water for several months.

U.S. Pat. No. 3,990,381 to Shepherd discloses various polymers employed for coatings, especially antifouling coatings, for watercraft and underwater static structures, e.g. copolymers of hydrophilic monomers such as methyl methacrylate-hydroxyethyl methacrylate copolymers, and copolymers of vinyl pyrrolidone and acrylic monomers. However, these polymers are water-soluble or have a poor water-resistance, and in order to render then water-insoluble or water resistant, they must be cross-linked, for instance, by means of cross-linking agents. The cross-linked antifouling coatings are hard to leach antifouling agents and, therefore, the antifouling property is remarkably decreased.

In general, when an antifouling ship bottom paint film is allowed to stand in air for several weeks, checking or cracking occurs. Also, with the lapse of time the roughness which is accelerated by navigation occurs on the surface of the film. Upon navigation the roughness causes the occurrence of turbulence by which the erosion of the film is remarkably accelerated. Also, the turbulence causes speed down and extra fuel is required to speed up. Although there is no fouling during navigation, a ship bottom is fouled when a ship is at anchor. Therefore, a ship bottom paint is required to have both the film toughness and antifouling property.

OBJECTS OF THE INVENTION

It is an object of the present invention to provide a process for extending the life of an antifouling paint film for structures immersed in sea water.

This and other objects of the invention will become apparent from the description hereinafter.

BRIEF DESCRIPTION OF THE DRAWINGS

FIGS. 1 and 2 are graphs showing comparison in moisture permeability of a film formed from a protective coating composition containing an acrylic polymer-grafted hydrophilic polymer according to the present invention with a film formed from a composition containing a mixture of an acrylic polymer and a hydrophilic polymer.

DETAILED DESCRIPTION

It has now been found that the above-mentioned objects can be attained by applying onto an antifouling paint film a coating of a water-resistant, water-permeable graft polymer prepared by polymerizing one or more vinyl monomers in the presence of a hydrophilic polymer. In the present invention, the coating of the water-resistant, water-permeable graft polymer prevents the excessive degradation of the antifouling paint film and gives the paint film an additional toughness, whereby the antifouling property of the paint film is maintained for a long period of time.

Heretofore, there has been known a process for improving the toughness of a colored paint film by applying a clear coating onto the paint film. However, the process is not applicable to the antifouling paint film, because a conventional clear coating has a sufficient toughness but has not a proper water-permeability. For this reason, the antifouling effect of the paint film is considerably lowered though the toughness is improved. On the other hand, a conventional water-permeable coating has a poor water-resistance and is not useful as a protective coating for the antifouling paint film.

For the protective coating applied onto the antifouling paint film, there are required both a sufficient water-resistance and a proper water-permeability. The sufficient water-resistance is essential for maintaining the toughness of the protective coating in water for a long period of time. A poor water-resistance results in the degradation of the protective coating within a short period of time. The proper water-permeability is essential for controlling the leaching of an antifouling agent contained in the antifouling paint film.

The present inventors have developed novel graft polymer being capable of giving a coating satisfying the above-mentioned properties. That is to say, the graft polymer of the present invention can provide protective coatings having both sufficient water-resistance and proper water-permeability.

Hydrophilic acrylic polymers such as poly-2-hydroxyethyl acrylate (or methacrylate) and copolymers of 2-hydroxyethyl acrylate (or methacrylate) as a main component have the water-permeability. When such polymers are utilized alone as a protective coating, there is required a procedure such as cross-linking, since the water-resistance is not sufficient.

Also, water-resistant polymers such as acrylic polymers may be improved to provide a coating having the water-permeability by admixing with a hydrophilic polymer. However, in case of providing the water-permeability to a coating of a water-resistant polymer by merely admixing it with a hydrophilic polymer, not only the water-resistance is extremely decreased, but also the water-permeability of a coating formed from such a mixture is insufficient as shown in FIGS. 1 and 2. In FIGS. 1 and 2, there are shown the moisture permeabilities as defined hereinafter of a film formed from a protective coating composition containing a methyl methacrylate/ethyl acrylate/acrylic acid copolymer-grafted hydrophilic polymer and a film formed from a composition containing a mixture of a methyl methacrylate/ethyl acrylate/acrylic acid copolymer and a hydrophilic polymer, where the weight ratio of the acrylic monomers is methyl methacrylate/ethyl acrylate/acrylic acid=69/30/1 and the proportion of the hydrophilic polymer, i.e. polyvinyl pyrrolidone in FIG. 1 and polypropylene glycol in FIG. 2, is shown by a value calculated according to the equation, hydrophilic polymer X 100/solid matters in the composition (% by weight).

According to the present invention, the water-permeability can be provided to a water-resistant polymer without lowering the water-resistance by graft-polymerizing one or more vinyl monomers onto a hydrophilic polymer. Thus, the graft polymers of the present invention can provide excellent protective coatings having proper water-permeability as well as sufficient water-resistance without conducting curing or cross-linking of polymers. The use of such graft polymers having both sufficient water-resistance and proper water-permeability is an important feature of the present invention.

The hydrophilic polymers employed in the present invention are polymerization products of monomers having hydrophilic groups and polymers having a large number of hydrophilic groups. Examples of the hydrophilic polymer employed in the present invention are polyvinyl alcohol, polyethylene glycol, polypropylene glycol, polyvinyl pyrrolidone, and their derivatives.

The graft polymers employed in the present invention as a binder for the protective coating composition for an antifouling paint film are prepared by polymerizing one or more vinyl monomers in the presence of the hydrophilic polymer in a usual manner, in other words, by graft-polymerizing one or more vinyl monomers onto the hydrophilic polymer. Examples of the vinyl monomer employed in the present invention are methacrylic acid esters such as methyl methacrylate, ethyl methacrylate, butyl methacrylate and lauryl methacrylate, acrylic acid esters such as methyl acrylate, ethyl acrylate, n-butyl acrylate, sec-butyl acrylate, isobutyl acrylate and 2-ethylhexyl acrylate, acrylonitrile, styrene, α-methyl styrene and vinyl acetate. These vinyl monomers may be employed with a minor amount of other hydrophilic vinyl monomers such as acrylic acid, methacrylic acid, 2-hydroxyethyl methacrylate, acrylamide and vinyl ethers. Also, the graft polymers may be modified to make cross-linkable by incorporating a cross-linkable monomer unit into the polymer chain.

The graft polymerization of the vinyl monomers onto the hydrophilic polymer is carried out in a conventional polymerization manner. For instance, the hydrophilic polymer and a part of a polymerization initiator are dissolved in a solvent, and the polymerization is carried out at an elevated temperature by adding dropwise a vinyl monomer or monomers to the solution. The polymerization is preferably carried out in an organic solvent such as toluene, xylene, butyl acetate, methyl isobutyl ketone and mixtures thereof. These organic solvents may be employed in combination with an alcohol such as isopropyl alcohol and butanol. When carrying out the polymerization in the organic solvent, the resulting reaction mixture which is usually a colorless, transparent composition or a cloudy composition may be employed as it is as a protective coating composition.

In general, the graft polymerization is carried out so that the graft efficiency of the hydrophilic polymer is more than about 30% by weight, preferably more than about 50% by weight. When the graft efficiency is less than about 30% by weight, the obtained reaction mixture is similar to a mere blend of the hydrophilic polymer and the vinyl polymer and the objects of the present invention can not be attained.

The term "graft efficiency of the hydrophilic polymer" as used herein shows the proportion of the hydrophilic polymer participating in graft polymer to the hydrophilic polymer employed in the graft polymerization, and is shown by the following equation.

Graft efficiency (% by weight) = $\dfrac{\text{Weight of hydrophilic polymer grafted}}{\text{Weight of hydrophilic polymer}} \times 100$ The amounts of the hydrophilic polymer and the vinyl monomers may vary depending on the kinds of hydrophilic polymer and vinyl monomers employed, and should be determined so that the polymerization product has a sufficient water-resistance and proper water-permeability. It is essential for the present invention that the film formed from the obtained protective coating composition has a moisture permeability of 45 to 480 g.0.1 mm/m$^2$.24 hr.cmHg. When an antifouling paint film is applied with a protective coating having a moisture permeability of less than 45, an antifouling agent is not sufficiently leached from an antifouling paint film. Also, when the moisture permeability is higher than 480, the water-resistance of the protective coating is lowered. Further, it is preferable that the film formed from the protective coating composition has a water absorption as defined hereinafter of more than about 5% by weight. The water absorption is related to the kind and content of the hydrophilic polymer, and when the water absorption is less than 5% by weight, an antifouling agent is not sufficiently leached from an antifouling paint film.

to the protective coating composition, pigments and other additives may be added.

To the protective coating composition, pigments and other additives may be added.

The protective coating composition is usually diluted to have a solid content of 10 to 20% by weight, and is applied onto an antifouling paint film in a usual manner such as brush coating, spray coating and roller coating. As a diluent, alcohols such as isopropyl alcohol and butanol, methyl cellosolve, ethyl cellosolve, and mixtures of the alcohol as a main component and other solvents such as toluene, xylene, ethyl acetate, butyl acetate and methyl isobutyl ketone are suitably employed. These diluents are selected according to the property of the under-coated antifouling paint.

Onto the protective coating of the present invention, other anti-rusting paints and antifouling paints may be further applied.

When the protective coating composition is applied onto a known antifouling paint film according to the present invention, temporary rapid leaching of an antifouling agent from the paint film can be inhibited and the antifouling property can be maintained without lowering the antifouling effect for a long period of time since water always reaches the coating surface of the antifouling paint through the protective coating and an antifouling agent contained in the paint film is leached into water, while the protective coating can strengthen the paint film and can inhibit its degradation since the protective coating has toughness and water-resistance.

The present invention is more specifically described and explained by means of the following Examples, in which all % are by weight unless otherwise noted.

EXAMPLE 1

A coating composition was prepared by employing the following components.

| Methyl methacrylate | 63.3 g. |
|---|---|
| Ethyl acrylate | 12.4 g. |
| 2-Hydroxyethyl methacrylate | 4.0 g. |
| Polypropylene glycol | 20.0 g. |
| Benzoyl peroxide | 0.8 g. |
| Toluene | 150.0 g. |

A 500 ml. four neck flask was charged with polypropylene glycol, toluene and a part of benzoyl peroxide (0.2 g.), and the temperature was elevated to 90°±5° C. The monomers were added dropwise to the flask over 1.5 hours in a nitrogen stream, and then the polymerization was continued for 6 hours at the above temperature.

EXAMPLE 2

The procedure of Example 1 was repeated except that the following components were employed.

| Methyl methacrylate | 53.6 g. |
|---|---|
| Ethyl acrylate | 22.4 g. |
| 2-Hydroxyethyl methacrylate | 4.0 g. |
| Polypropylene glycol | 20.0 g. |
| Benzoyl peroxide | 0.8 g. |
| Toluene | 150.0 g. |

EXAMPLES 3 to 5

Coating compositions were prepared by employing the components shown in Table 1 in the same manner as in Example 1.

Table 1

| Components (g.) | Example 3 | Example 4 | Example 5 |
|---|---|---|---|
| Methyl methacrylate | 60.3 | 56.9 | 63.8 |
| Ethyl acrylate | 25.2 | 23.9 | 12.2 |
| 2-Hydroxyethyl methacrylate | 4.5 | 4.2 | 4.0 |
| Polyvinyl pyrrolidone | 10.0 | 15.0 | 20.0 |
| Benzoyl peroxide | 0.9 | 0.8 | 0.8 |
| Toluene | 120.0 | 100.0 | 100.0 |
| Isopropyl alcohol | 30.0 | 50.0 | 50.0 |

Graft efficiency of the hydrophilic polymer which shows the proportion of the hydrophilic polymer participating in graft polymer to the hydrophilic polymer employed, was measured with respect to the coating compositions obtained in Examples 3 and 4.

The hydrophilic polymer which did not participate in graft polymerization remains as a solvent-soluble portion, and is considered to be extracted with the solvent. Therefore, the graft efficiency was measured by extraction as follows:

From the coating compositions obtained in Examples 3 and 4, coating films were prepared and dried under reduced pressure. Each of the dried coating films was then extracted with a hot water by employing a Soxhlet extractor until the weight loss of the coating film became zero. The graft efficiency of the hydrophilic polymer was calculated according to the following equation.

$$\text{Graft efficiency (\%)} = \left(1 - \frac{\text{Weight loss (\%)}}{\text{Hydrophilic polymer content (\%)}}\right) \times 100$$

As a control, the same polymerization of Example 3 or 4 repeated except that polyvinyl pyrrolidone was not employed. To the obtained reaction mixture were added the same amounts of polyvinyl pyrrolidone as in Examples 3 and 4, respectively, to give blends of the acrylic polymer and the hydrophilic polymer. The graft efficiency was also measured in the same manner as the above.

The results of the graft efficiency are shown in Table 2.

Table 2

| | Hydrophilic polymer content (%) | Weight loss (%) | Graft efficiency (%) |
|---|---|---|---|
| Example 3 | 10 | 3 | 70 |
| Example 4 | 15 | 6.3 | 57 |
| Blend corres. to Ex. 3 | 10 | 10.6 | 0 |
| Blend corres. to Ex. 4 | 15 | 15.2 | 0 |

Comparative Example 1

To a glass-lined reactor was charged 800 g. of ethanol, 20 g. of methyl methacrylate, 180 g. of hydroxyethyl methacrylate and 0.5 g. of t-butyl peroctoate. The reactor was flushed with nitrogen and heated to 80° C. over a period of 1 hour. The reactor was stirred at 80° C. for 6 hours. To the thus obtained reaction mixture were added 2% of ethylene glycol dimethacrylate, 1% of benzoyl peroxide and 0.4% of N,N-dimethyl aniline, based on the weight of the copolymer, to give a coating composition.

Comparative Example 2

To a 10% solution of polyvinyl pyrrolidone in ethanol was added 2 phr. of ammonium persulfate as a 10% aqueous solution, to give a coating composition.

Comparative Example 3

The polymerization of monomers consisting of 20 g. of vinyl pyrrolidone, 65 g. of methyl methacrylate and 15 g. of ethyl acrylate was carried out in the presence of 1.0 g. of benzoyl peroxide in a mixed solvent consisting of 100 g. of toluene and 50 g. of isopropyl alcohol at a temperature of 80° C. for 7 hours. The resulting reaction mixture was used as a coating composition.

By employing the coating compositions obtained in Example 5 and Comparative Examples 1 to 3, the water-resistance of these compositions were evaluated as follows:

Each coating composition obtained was applied to a polyester-fiberglass laminated panel (50×100×2 mm.) by brush, and was dried at 20° C. for 96 hours. The thickness of dry films was from 20 to 27μ. The panels were then immersed in water at 20° C. for 72 hours and the appearance of the coatings was observed. Also, the water absorption (% by weight) was obtained by comparing the weight of the wet coating with the weight of the dry coating.

The results of the appearance of coatings, solubility in water, dimensional change and water absorption are shown in Table 3.

-continued

| | |
|---|---|
| Toluene | 150.0 g. |

The reaction mixtures obtained in Examples 1 to 5 and Comparative Example 4 were employed as coating compositions. From the thus obtained coating compositions, coating films were prepared and the moisture permeability and water absorption thereof were measured as follows:

Moisture permeability

Table 3

| Composition | Transparency | Blister | Peeling off from panel | Softening | Solubility in water | Dimensional change** | Water absorption |
|---|---|---|---|---|---|---|---|
| Com. Ex. 1 | transparent | no | no | slightly soft | insoluble | less than 5% | 4% |
| Com. Ex. 2* | — | — | — | — | soluble | — | — |
| Com. Ex. 3 | very cloudy | noticeable | yes | very soft | slightly soluble | more than 50% | more than 50% |
| Ex. 5 | slightly cloudy | no | no | slightly soft | insoluble | less than 5% | 17.2% |

*After immersion for 24 hours, the coating of the composition B was completely dissolved in water.
**Dimensional change shows percent increase of length (afetr immersion at 20° C. for 72 hours) to the original length.

As is clear from Table 3, the protective coating of the present invention has a good water resistance.

The film forming copolymer consisting of the hydrophobic monomer units and hydrophilic monomer units as a main component in Comparative Example 1, i.e. methyl methacrylate-hydroxyethyl methacrylate copolymer (1:9 by weight), is water-soluble. The composition of Comparative Example 1 contains a cross-linking agent (ethylene glycol dimethacrylate) and the coating is cured by means of benzoyl peroxide and N,N-dimethyl aniline accelerator. The appearance of the coating is good, but the percent water absorption is very low.

The hydrophilic homopolymer, i.e. polyvinyl pyrrolidone, of the coating composition obtained in Comparative Example 2 is also water-soluble. The coating of Comparative Example 2 was completely dissolved in water after immersion for 24 hours.

The monomer components of the vinyl pyrrolidonemethyl methacrylate-ethyl acrylate copolymer (20:65:15 by weight) of the composition obtained in Comparative Example 3 are similar to those of the polymer of Example 5. However, the coating of Comparative Example 3 is far inferior to the coating of the present invention. This difference is based on the fact that the copolymer of Comparative Example 3 is merely a copolymer and not a graft copolymer, whereas the polymers of the present invention are graft polymers.

It would also be understood from Table 3 that according to the present invention, protective coatings having the excellent water resistance can be formed without employing a cross-linking agent.

Comparative Example 4

A coating compositon was prepared by employing the following components in the same manner as in Example 1.

| | |
|---|---|
| Methyl methacrylate | 67.0 g. |
| Ethyl acrylate | 28.0 g. |
| 2-Hydroxyethyl methacrylate | 5.0 g. |
| Benzoyl peroxide | 1.0 g. |

Spaces divided by a film were maintained at 88% R.H. and 0% R.H., respectively, and the amount of water vapor permeated through the film at 20° C. for 24 hours was measured. From the amount of water vapor permeated through the film, moisture permeability was calculated according to the following equation.

Moisture permeability (g · 0.1mm/m² · 24hr · cmHg) = $\frac{Q \cdot l}{a \cdot t(p_a - p_b)}$ Q: Amount of water vapor which permeated
l: Film thickness
a: Film area
t: Time
$(p_a - p_b)$: Difference in water vapor pressure between both spaces Water Absorption A film was dipped in water for 72 hours, and the amount of water absorbed was measured. Water absorption was calculated according to the following equation.

Water absorption (%) = $\frac{\text{Weight of water absorbed (g.)}}{\text{Dry weight of film (g.)}} \times 100$ The results of the measurement of moisture permeability and water absorption are shown in Table 2.

Table 4

| | Moisture Permeability | Water Absorption |
|---|---|---|
| Example 1 | 130 | 10.1 |
| Example 2 | 149 | 9.8 |
| Example 3 | 82 | 12.8 |
| Example 4 | 141 | 14.8 |
| Example 5 | 176 | 16.7 |
| Com. Ex. | 41 | 1.4 |

The coating composition obtained in each Example and Comparative Example 4 was sprayed onto each sample plate coated with the following antifouling paint to give a coating having a thickness of about 12μ. The thus prepared specimens were exposed in a sea at a depth of one meter. As Control, the sample plates coated with the antifouling paint were also exposed at the same time.

The employed antifouling paints comprising a resin binder and an antifouling agent are as follows:

(a) Chlorinated rubber-cuprous oxide type (commercially available under the trademark "TOA SR ANTI-FOULING EXTRA SUPER TROPICAL" made by Toa Paint Company, Limited)

(b) Polyvinyl chloride-cuprous oxide type (commercially available under the trademark "VINAL ANTI-FOULING SUPER" made by Toa Paint Company, Limited)

(c) Oleoresinous-cuprous oxide type (commercially available under the trademark "TOA ANTI-FOULING SUPER" made by Toa Paint Company, Limited)

(d) Chlorinated rubber-organotin compound type (commercially available under the trademark "TOA SR ANTI-FOULING OG" made by Toa Paint Company, Limited)

After 3, 6, 9, 12 and 18 months, appearances of the fouling of aquatic organisms such as marine algae, barnacles and ascidians and the erosion of an antifouling paint film applied with the coating composition were observed. The fouling of organisms and the erosion of film were evaluated according to the following classifications, respectively.

Fouling of Organisms

0: No or very little fouling
1: Little fouling
2: Considerable fouling
3: Fouling of wide range
4: Fouling all over the surface
-: Dense and thick fouling all over the surface

Erosion of Film

A: No or very little erosion
B: Considerable erosion
C: Very considerable erosion
-: Difficulty in evaluation due to fouling of organisms The results of the exposure test in a sea are shown in Tables 5, 6, 7 and 8.

From the results shown in Tables 5 to 8, it will be understood that the over-coating by the coating composition obtained in Comparative Example 4 (which shows poor moisture permeability as in Table 4) prohibits the exhibition of the antifouling effect of antifouling paints and, on the other hand, the coating composition employed in the present invention strengthens an antifouling paint film without impairing the antifouling effect.

Table 5

Application onto chlorinated rubber-cuprous oxide antifouling paint film

| | After 3 months | | After 6 months | | After 9 months | | After 12 months | | After 18 months | |
|---|---|---|---|---|---|---|---|---|---|---|
| | Fouling | Erosion | Fouling | Erosion | Fouling | Erosion | Fouling | Erosion | Fouling | Erosion |
| Example 1 | 0 | A | 0 | A | 0 | A | 0 | A | 0 | A |
| Example 2 | 0 | A | 0 | A | 0 | A | 0 | A | 0 | A |
| Example 3 | 0 | A | 0 | A | 0 | A | 1 | A | 1 | A |
| Example 4 | 0 | A | 0 | A | 0 | A | 0 | A | 0 | A |
| Example 5 | 0 | A | 0 | A | 0 | A | 0 | B | 0 | B |
| Com. Ex. 4 | 4 | A | 4 | — | — | — | — | — | — | — |
| Control | 0 | B | 0 | B | 0 | B | 1 | C | 3 | C |

Table 6

Application onto polyvinyl chloride-cuprous oxide antifouling paint film

| | After 3 months | | After 6 months | | After 9 months | | After 12 months | | After 18 months | |
|---|---|---|---|---|---|---|---|---|---|---|
| | Fouling | Erosion | Fouling | Erosion | Fouling | Erosion | Fouling | Erosion | Fouling | Erosion |
| Example 1 | 0 | A | 0 | A | 0 | A | 0 | A | 0 | A |
| Example 2 | 0 | A | 0 | A | 0 | A | 0 | A | 0 | A |
| Example 3 | 0 | A | 0 | A | 0 | A | 1 | A | 1 | A |
| Example 4 | 0 | A | 0 | A | 0 | A | 0 | A | 0 | A |
| Example 5 | 0 | A | 0 | A | 0 | A | 0 | B | 0 | B |
| Com. Ex. 4 | 4 | — | — | — | — | — | — | — | — | — |
| Control | 0 | A | 0 | B | 0 | B | 1 | B | 2 | C |

Table 7

Application onto oleoresinous-cuprous oxide antifouling paint film

| | After 3 months | | After 6 months | | After 9 months | | After 12 months | | After 18 months | |
|---|---|---|---|---|---|---|---|---|---|---|
| | Fouling | Erosion | Fouling | Erosion | Fouling | Erosion | Fouling | Erosion | Fouling | Erosion |
| Example 1 | 0 | A | 0 | A | 0 | A | 0 | A | 2 | A |
| Example 2 | 0 | A | 0 | A | 0 | A | 0 | A | 2 | A |
| Example 3 | 0 | A | 0 | A | 0 | A | 1 | A | 3 | A |
| Example 4 | 0 | A | 0 | A | 0 | B | 0 | B | 1 | B |
| Example 5 | 0 | A | 0 | A | 0 | B | 0 | B | 1 | B |
| Com. Ex. 4 | 4 | — | — | — | — | — | — | — | — | — |
| Control | 0 | B | 0 | B | 0 | C | 1 | C | 4 | — |

Table 8

| | Application onto chlorinated rubber-organotin compound antifouling paint film | | | | | | | | | |
|---|---|---|---|---|---|---|---|---|---|---|
| | After 3 months | | After 6 months | | After 9 months | | After 12 months | | After 18 months | |
| | Fouling | Erosion | Fouling | Erosion | Fouling | Erosion | Fouling | Erosion | Fouling | Erosion |
| Example 1 | 0 | A | 0 | A | 1 | A | 2 | A | 2 | A |
| Example 2 | 0 | A | 0 | A | 1 | A | 2 | A | 2 | A |
| Example 3 | 0 | A | 1 | A | 2 | A | 3 | A | 3 | A |
| Example 4 | 0 | A | 0 | A | 1 | A | 2 | A | 2 | A |
| Example 5 | 0 | A | 0 | A | 1 | A | 2 | B | 2 | B |
| Com. Ex. 4 | 4 | A | — | — | — | — | — | — | — | — |
| Control | 0 | A | 0 | B | 2 | B | 2 | B | 4 | C |

What we claim is:

1. A process for extending the life of an anti-fouling paint film which comprises applying onto an anti-fouling paint film a composition to form a protective coating consisting essentially of a graft polymer having a graft efficiency of more than 30% by weight prepared by polymerizing at least one vinyl monomer slected from the group consisting of methacrylic acid esters, acrylic acid esters, acrylonitrile, styrene, α-methyl styrene and vinyl acetate in the presence of a hydrophilic polymer selected from the group consisting of polyvinyl alcohol, polyethylene glycol, polypropylene glycol, polyvinyl pyrrolidone and their derivatives, said protective coating having a moisture permeability of 45 to 480 g.0.1 mm/m$^2$.24 hr.cmHg.

2. The process of claim 1, wherein said protective coating has a water absorption of more than about 5% by weight.

3. The process of claim 1, wherein said vinyl monomer is employed with a minor amount of a hydrophilic vinyl monomer selected from the group consisting of acrylic acid, acrylamide, methacrylic acid, 2-hydroxyethyl methacrylate and vinyl ethers.

4. The process of claim 1, wherein said composition is a polymerization reaction mixture of the vinyl monomer in the presence of the hydrophilic polymer in an organic solvent selected from the group consisting of toluene, xylene, butyl acetate, methyl isobutyl ketone and mixture thereof.

* * * * *